United States Patent [19]
Suzuki et al.

[11] Patent Number: 5,614,780
[45] Date of Patent: Mar. 25, 1997

[54] LIGHT SOURCE FOR PROJECTION TYPE DISPLAY DEVICE

[75] Inventors: Toshihiro Suzuki; Noriyuki Ohashi; Tetsuya Hamada; Takashi Kanno; Hisashi Yamaguchi, all of Kawasaki, Japan

[73] Assignee: Fujitsu Limited, Japan

[21] Appl. No.: 490,804

[22] Filed: Jun. 15, 1995

[30] Foreign Application Priority Data

Jun. 16, 1994 [JP] Japan .................................. 6-134100

[51] Int. Cl.⁶ ..................................................... H01K 1/58
[52] U.S. Cl. ............................................... 313/35; 313/24
[58] Field of Search ......................... 313/35, 36, 22, 313/24, 25, 40, 45, 44, 34; 315/112

[56] References Cited

U.S. PATENT DOCUMENTS

| | | | |
|---|---|---|---|
| 3,949,258 | 4/1976 | Soodak | 313/43 |
| 4,600,857 | 7/1986 | Suhar | 313/44 |
| 4,695,757 | 9/1987 | Ury et al. . | |
| 4,894,592 | 1/1990 | Ervin et al. . | |
| 4,954,756 | 9/1990 | Wood et al. | 313/44 |
| 5,021,704 | 1/1991 | Walker et al. . | |

OTHER PUBLICATIONS

"New Long–Lived Stable Light Source for Projection–Display Applications,", MacLennan, et al., *SID 92 DIGEST*, pp. 460–463, 1992.

*Primary Examiner*—Sandra L. O'Shea
*Assistant Examiner*—Vip Patel
*Attorney, Agent, or Firm*—Greer, Burns & Crain, Ltd.

[57] ABSTRACT

A light source for use in a projection type liquid crystal display device. The light source includes an electrodeless light emitting member having a light emitting material sealed in a transparent tube to emit light upon the application of microwave electromagnetic energy. A concave mirror is arranged on the outside of the light emitting member, and the transparent tube is supported by a rotatable rod-like support member which extends through the concave mirror. Means in the form of a vane, a screw or a projection is arranged on the rod-like support member or on the light emitting member for stirring air, while the rod-like support member rotates, to cool the light emitting member.

3 Claims, 6 Drawing Sheets

LIGHT SOURCE FOR PROJECTION TYPE DISPLAY DEVICE

BACKGROUND OF THE INVENTION

1. Field of the Invention

The present invention relates to a light source adapted for use in a projection type display in which light is projected to a screen to produce an enlarged image after the light is modulated, for example, by liquid crystal panels, to produce an image. The present invention also relates to such a projection type display device.

2. Description of the Related Art

Recently, the development of projection type liquid crystal display using liquid crystal panels has increased rapidly. A metal halide lamp is typically used as a light source in a projection type liquid crystal display device, because a high light emission efficiency of 80 lumen per watt and a high color temperature of 5,000 Kelvin can be attained. The metal halide lamp comprises a light emitting member including mercury or rare-earth metal sealed in a transparent quartz tube, and electrodes are arranged in the light emitting member for inducing a discharge in the tube. The metal halide lamp is incorporated in a projection type liquid crystal display together with a concave mirror.

An electrodeless light source was disclosed in, for example, SID DIGEST, page 460–463, by D. A. MacLennan et al. In this electrodeless light source device, a light emitting material is sealed in a transparent quartz tube, and the light emitting material converts electric energy into light during the application of microwave energy, at 2.45 GHz, from an RF source arranged apart from the transparent quartz tube.

In this light source device, any electrode which may be necessary in the other conventional light source are not necessary because electrical energy is supplied to the light emitting material in the form of an electromagnetic wave. This light source can produce intense light but the light emitting material does not include mercury. Accordingly, this light source is advantageous for protecting the environment and is expected to take the place of a metal halide lamp.

The light emitting member is supported by an integral rod-like support member. However, it is necessary to cool the electrodeless light source because the temperature of the quartz tube of the light emitting member rises considerably and there is a possibility that the quartz tube may melt. Therefore, in the prior art, the light emitting member, together with the rod-like support member, is rotated and an air cooling nozzle is arranged near to the light emitting member. However, since the air cooling nozzle is arranged on the outside of the light emitting member, part of the light travelling from the light source to an object is shaded by the nozzle and the light is not distributed uniformly, so that an image projected onto a screen of a projection type display is affected a brightness and an a distributions that are uneven. In addition, a concave mirror (reflector) is not arranged in this prior art, but the light can be more effectively utilized in a projection type display when a concave mirror is used. However, if a concave mirror is added, a part of the light, which is emitted from the rear portion of the light emitting member and reflected by the concave mirror travelling to the object, is also shaded or decreased by the air cooling nozzle, further resulting in an uneven brightness distribution and an uneven color distribution.

SUMMARY OF THE INVENTION

The object of the present invention is to provide a light source, including a light emitting member, which does not necessitate electrodes and which can be appropriately cooled, so that the light supplied from the light source is uniformly distributed.

Another object of the present invention is to provide a projection type display using such a light source device.

According to the present invention, there is provided a light source comprising a light emitting member including a transparent tube and a light emitting material for converting electromagnetic energy into light sealed in the transparent tube, a rod-like support member for supporting the light emitting member, rotating mechanism for supporting the rod-like support member with the light emitting member to cause the rod-like support member and the light emitting member to rotate, a concave mirror for reflecting the light emitted from the light emitting member, and means arranged on at least one of the rod-like support member and the light emitting member for stirring air with the rotation of the rod-like support member.

In this arrangement, the means for stirring air is arranged to cause air around the light emitting member to flow, and thus the light emitting member to be cooled. In the case where the means for stirring air comprises a projection or a structure having a particular shape (a vane or a screw) on the rod-like support member, the rod-like support member substantially extends on the axis of the concave mirror and is located behind the light emitting member, so that the means for stirring air does not shade the optical path of the light which travels from the light emitting member and the concave mirror to the object. On the other hand, in the case where the means for stirring air comprises a change in the shape of the light emitting member (relative to a circular shape), the surface of the light emitting member is transparent, so the means for stirring air does not shade the optical path of the light which travels from the concave mirror to the object. Accordingly, the light source according to the present invention can supply light with an even brightness distribution and without local shading shadows.

In a projection type display using this light source, a light with an even brightness distribution is supplied by the light source, so an uneven brightness distribution and an uneven color distribution in an image, which may be otherwise caused due to irregular light, are mitigated.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 6:
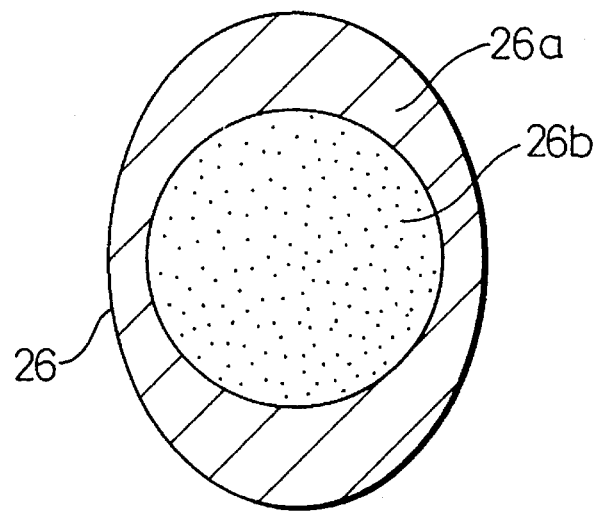
FIG. 6 is a cross-sectional view of the light source of FIG. 5, taken along the line VI—VI in FIG. 5.
Figure 7:
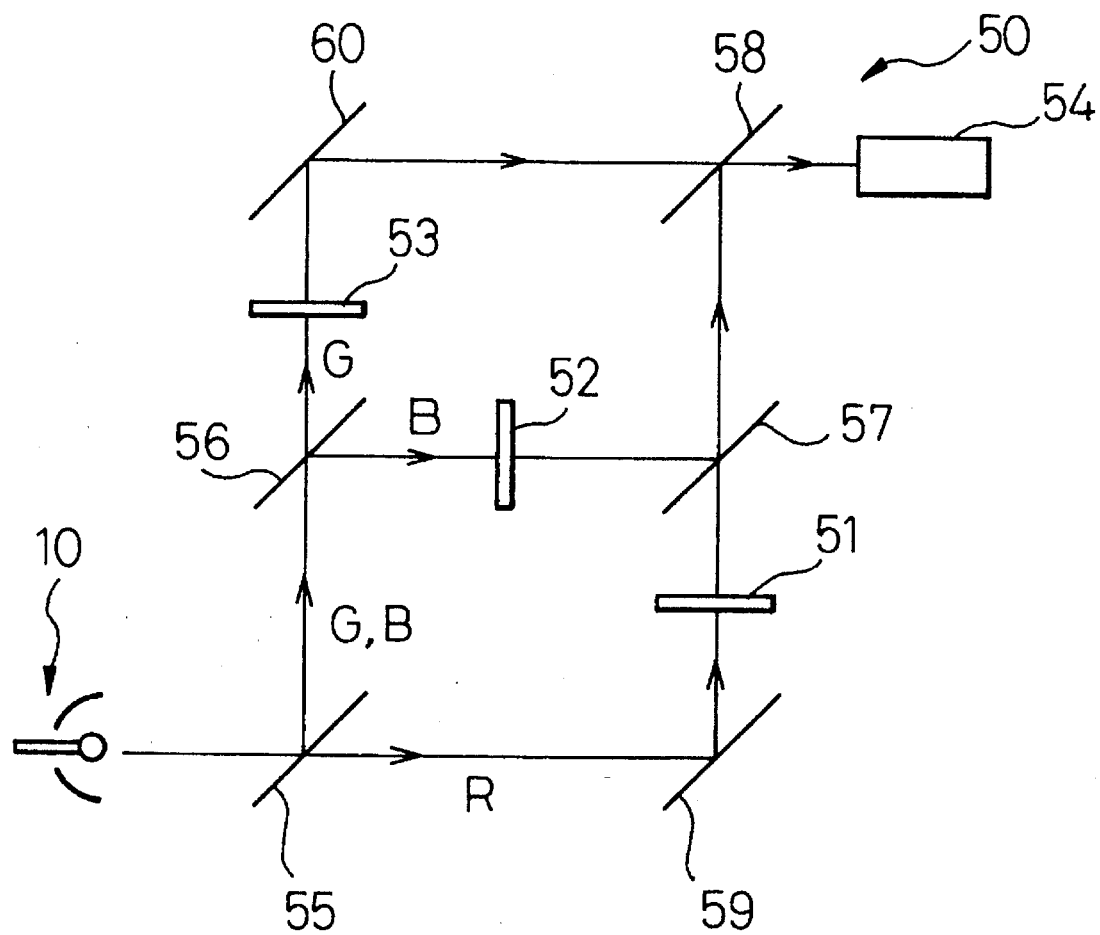
FIG. 7 is a diagrammatic view of a projection type display using the light source of FIGS. 1 to 6.

FIG. 7 shows a projection type liquid crystal display according to the present invention. The light source of FIGS. 1 to 6 can be used as a light source of this projection type display device.

In FIG. 7, the projection type display 50 comprises a light source 10, three liquid crystal panels 51, 52 and 53 for producing a color display, and a projection lens 54. Each of the liquid crystal panels 51, 52 and 53 is a twisted nematic liquid crystal panel which includes a liquid crystal held between a pair of transparent plates, and a polarizer and an analyzer arranged on the outside of the transparent plates, as is well known. Each of the liquid crystal panels 51, 52 and 53 is an indirect modulation element for modulating the respective color component of the light for producing an image.

The projection type display 50 also includes first to fourth dichroic mirrors 55, 56, 57, and 58, and totally reflecting mirrors 59 and 60, arranged as follows.

The light supplied by the light source 10 is separated into two components of the light (a red component R, and a green-blue component G-B) by the first dichroic mirror 55 in accordance with the transmission and reflection characteristics of the mirror. The reflected green-blue component G-B is further separated into two components of the light (a green component G and a blue component B) by the second dichroic mirror 56 in accordance with its characteristics. The red component R passing through the first dichroic mirror 55 passes through the liquid crystal panel 51 after being reflected by the totally reflecting mirror 59, and travels to the third dichroic mirror 57. The blue component B reflected by the second dichroic mirror 56 passes through the liquid crystal panel 52, and travels to the third dichroic mirror 57.

The red component R and the blue component B are combined together by the third dichroic mirror 57, and travel to the fourth dichroic mirror 58. Also, the green component G passing through the second dichroic mirror 56 passes through the liquid crystal panel 53, is reflected by the totally reflecting mirror 60, and travels to the fourth dichroic mirror 58. Thus, the red component R, the blue component B and the green component G are combined together by the fourth dichroic mirror 58, and travel to the projection lens 54 by which the light is projected to a screen (not shown) to produce an image on the screen.

Figure 1:
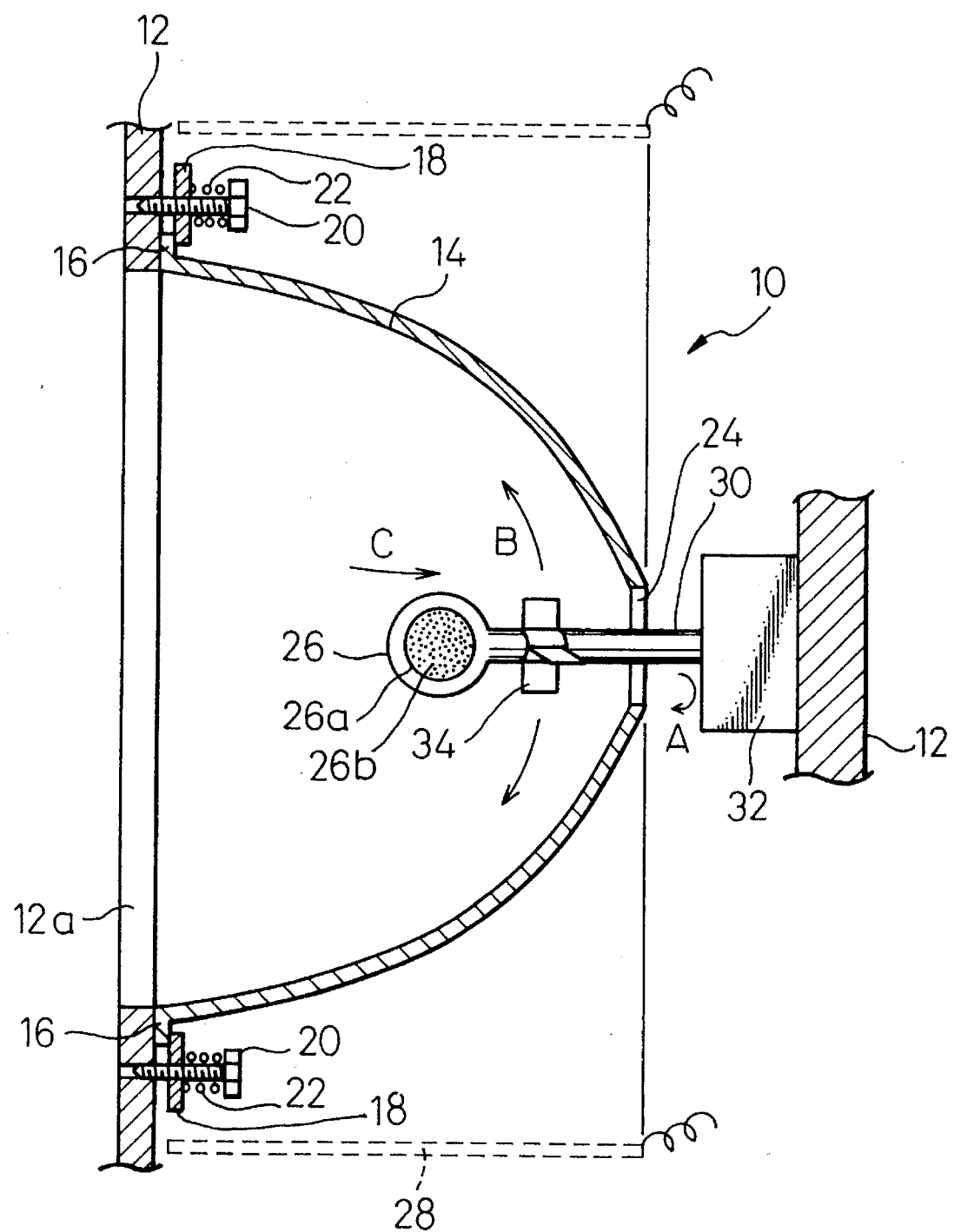
FIG. 1 is a cross-sectional view of a light source according to the first embodiment of the present invention.

FIG. 1 shows the light source 10 according to the first embodiment of the present invention. The light source 10 includes a concave mirror 14 attached to a lamp housing 12 which is adapted to be mounted to a casing of the projection type liquid crystal display 50 of FIG. 7. The lamp housing 12 has an opening 12a corresponding to the shape of the open end of the concave mirror 14 on the larger diameter side thereof, and the concave mirror 14 has a flange 16 which abuts against the wall around the opening 12a of the lamp housing 12. A fixing element 18 holds the flange 16 of the concave mirror 14, the fixing element 18 being fastened to the lamp housing 12 by bolts 20. Springs 22 are arranged between the fixing element 18 and the heads of the bolts 20, so that the concave mirror 14 is fixed to the lamp housing 12 under a resilient urging force.

An inserting hole 24 is provided in the end of the concave mirror 14 on the smaller diameter side thereof.

The light source 10 also includes a light emitting member 26 in the concave mirror 14. The light emitting member 26 includes a transparent quartz tube 26a and a light emitting material 26b to convert electromagnetic energy into light sealed into the transparent quartz tube 26a. RF source 28 is spaced apart from the transparent quartz tube 26a to apply microwave energy, at 2.45 GHz, to the light emitting material 26b, so that the light emitting material 26b converts electromagnetic energy into light.

The light emitting material 26b comprises a material such as sulfur which forms a plasma upon receiving microwave energy to emit a light, and the transparent quartz tube 26a has no electrodes. The light emitting material 26b is in the form of powder collected in the bottom of the transparent quartz tube 26a and adhered to the inner surface of the transparent quartz tube 26a when it does not emit light. The light emitting material 26b is in a transparent gaseous state when it emits light. The light emitting material 26b does not include mercury.

The light emitting member 26 is supported by a rod-like support member 30 which is formed from quartz and made integrally with the transparent quartz tube 26a. The rod-like support member 30 extends through the inserting hole 24 at the center of the concave mirror 14 (substantially on the optical axis of the concave mirror 14) without contacting the concave mirror 14. A rotating mechanism 32 is arranged on the outside of the concave mirror 14 for supporting the rod-like support member 30 with the light emitting member 26 to cause the rod-like support member 30 with the light emitting member 26 to rotate. The rotating mechanism 32 includes a motor (not shown), and the rod-like support member 30 is connected to the shaft of the motor. Therefore, the rod-like support member 30 and the light emitting member 26 can rotate in the direction of the arrow A, for example.

In addition, means for stirring air, while the rod-like support member 30 rotates, is arranged on the rod-like support member 30. This means for stirring air comprises at least one projection or a structure having a particular shape. In FIG. 1, this stirring means comprises a vanes 34 like the vanes in a centrifugal fan. When the rod-like support member 30 rotates, the vane 34 rotates to induce a flow of air from the rod-like support member 30 in the centrifugal direction (in the direction of the arrow B). This air flow induces a flow of air around the light emitting member 26 in the axial direction of the rod-like support member 30 (in the direction of the arrow C). Therefore, the transparent quartz tube 26a is effectively cooled.

FIGS. 2 to 6 show the other embodiments of the present invention. FIGS. 2 to 6 are shown in a simplified manner, but these embodiments include components identical to those in FIG. 1. That is, in the embodiments of FIGS. 2 to 6, the light source 10 includes the concave mirror 14, the light emitting member 26, the rod-like support member 30, and means for stirring air with the rotation of the rod-like support member 30.

Figure 2:
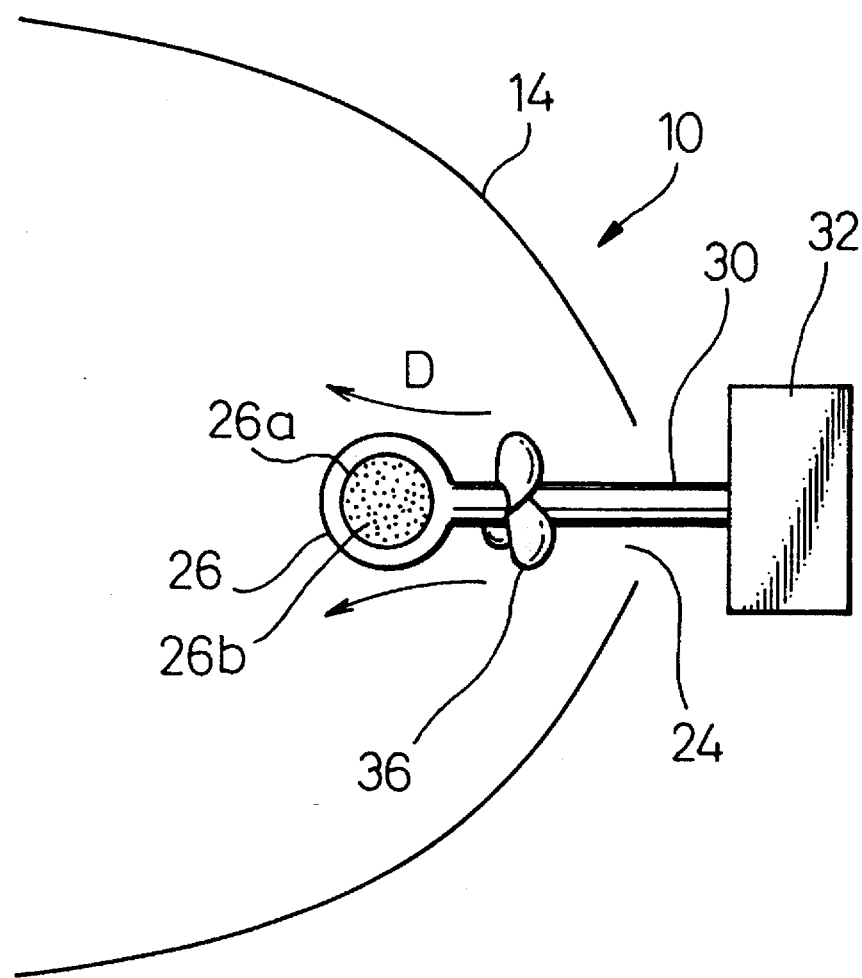
FIG. 2 is a cross-sectional view of a light source according to the second embodiment of the present invention.

In FIG. 2, means for stirring air with the rotation of the rod-like support member 30 comprises vanes 36 arranged on the rod-like support member 30, similar to the vanes of an axial flow fan. When the rod-like support member 30 rotates, the vane 36 rotates and induces a flow of air in the axial direction (in the direction of the arrow D) from the rod-like support member 30 to the transparent quartz tube 26a. This air flow becomes a flow of air in the axial direction of the transparent quartz tube 26a around the transparent quartz tube 26a and efficiently cools the transparent quartz tube 26a.

Figure 3:
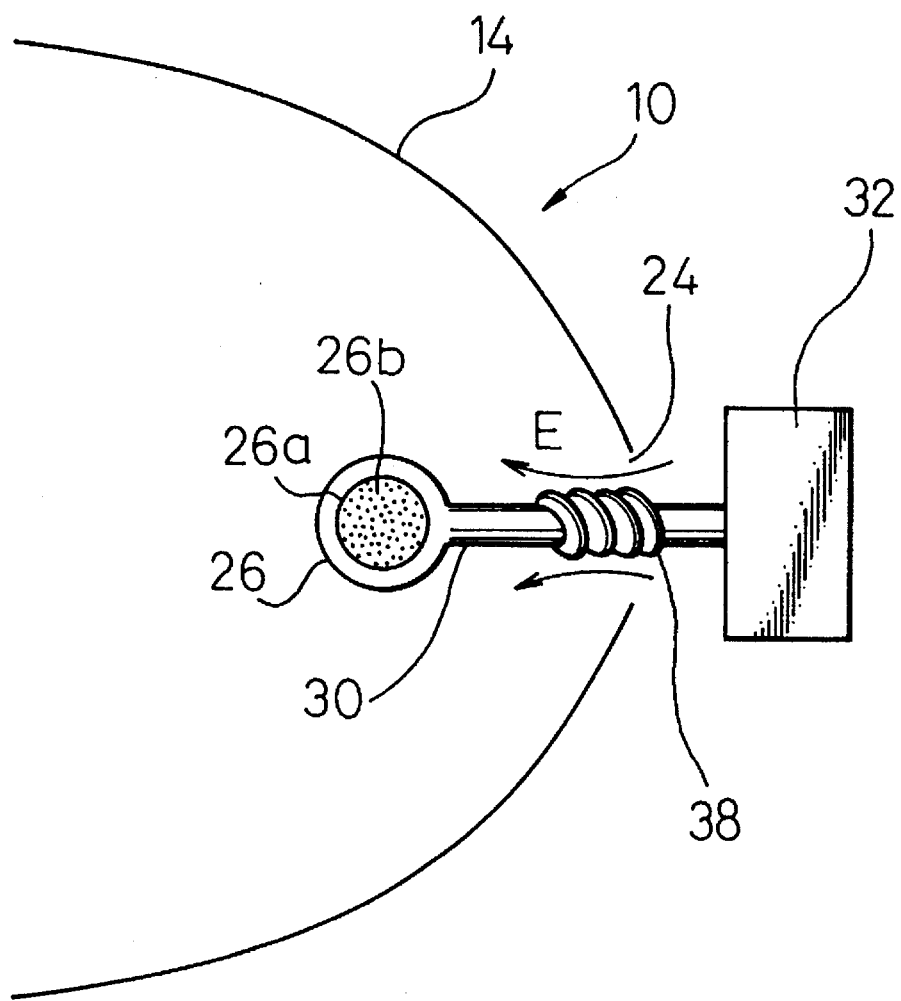
FIG. 3 is a cross-sectional view of a light source according to the third embodiment of the present invention.

In FIG. 3, means for stirring air with the rotation of the rod-like support member 30 comprises a screw 38 arranged on the rod-like support member 30. When the rod-like support member 30 rotates, the screw 38 rotates and induces a flow of air in the axial direction (in the direction of the arrow E) from the rod-like support member 30 to the transparent quartz tube 26a. The air flows along the surface of the rod-like support member 30 and efficiently cools the transparent quartz tube 26a. The screw 38 is also arranged near the inserting hole 24 in the concave mirror 14, and is adapted for delivering air from the outside to the inside of the concave mirror 14.

Figure 4:
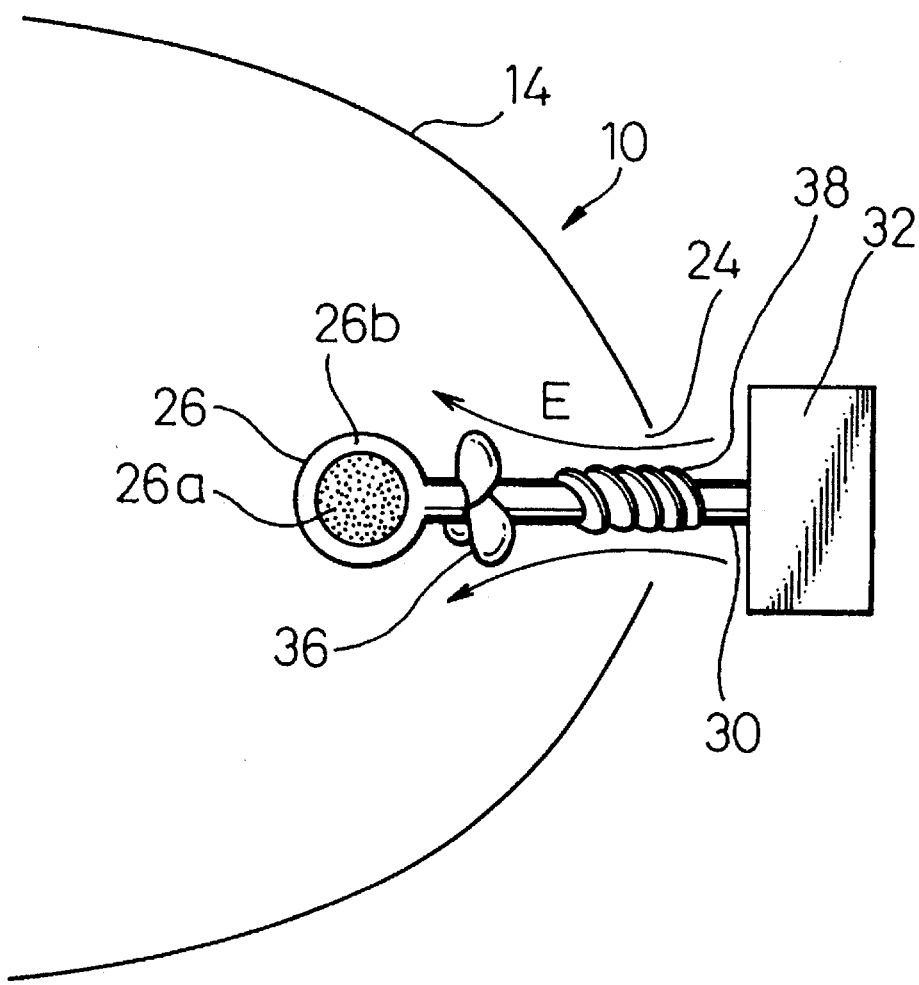
FIG. 4 is a cross-sectional view of a light source according to the fourth embodiment of the present invention.

In FIG. 4, means for stirring air with the rotation of the rod-like support member 30 comprises the combination of a vane 36 and a screw 38 arranged on the rod-like support member 30. When the rod-like support member 30 rotates, the vane 36 and the screw 38 rotate and induce a flow of air in the axial direction (in the direction of the arrow E) from the rod-like support member 30 to the transparent quartz tube 26a. The air is blown to the transparent quartz tube 26a and efficiently cools the transparent quartz tube 26a.

Figure 5:
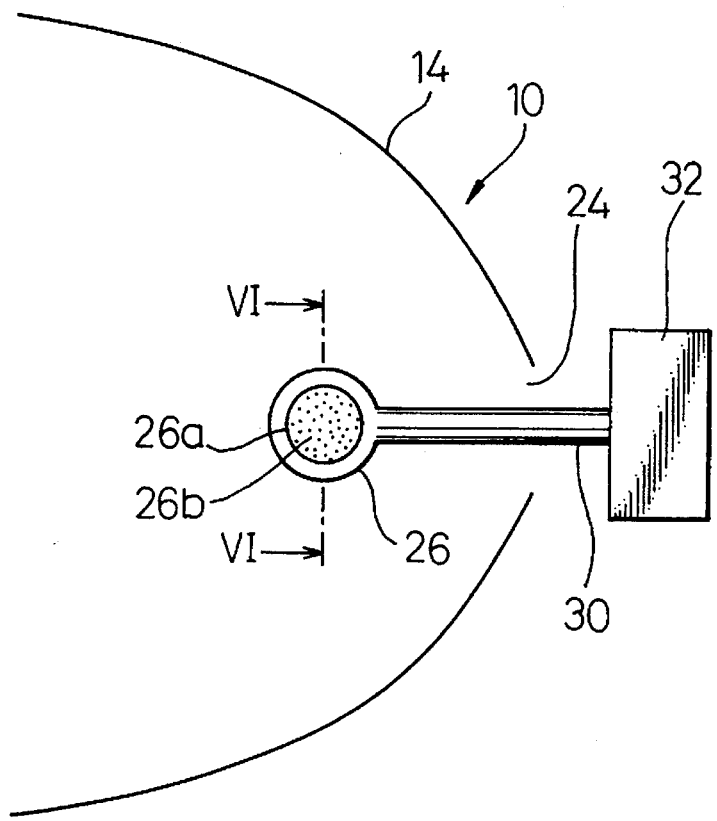
FIG. 5 is a cross-sectional view of a light source according to the fifth embodiment of the present invention.

In FIGS. 5 and 6, means for stirring air with the rotation of the rod-like support member 30 comprises a structure arranged on the light emitting member 26 for inducing a flow of air with the light emitting member 26 rotates. In particular, the transparent tube 26a has a substantially ellipsoidal shape in a cross section taken perpendicular to the axis of the rod-like support member 30. Therefore, the rod-like support member 30 rotates, the transparent tube 26a acts like a vane or a screw 38 so as to stir air around the transparent quartz tube 26a. The hot air adhering to the surface of the transparent quartz tube 26a is sheared from the transparent quartz tube 26a and efficiently cools the transparent quartz tube 26a. However, the light emitted from the light emitting material 26a in the transparent quartz tube 26a and the light reflected by the concave mirror 14 to the front side are not disturbed by this movement of the transparent quartz tube 26a.

As explained, according to the present invention, it is possible to cool the light emitting member without the use of any air cooling nozzle arranged in the prior art in front of or laterally of the light emitting member, and thus the light is not shaded by such a nozzle. Therefore, the light supplied from the light source is uniformly distributed, so it is possible to obtain a projection type display which can form an image without an uneven brightness distribution and an uneven color distribution.

We claim:

1. A light source comprising:
    a light emitting member including a transparent tube and a light emitting material for converting electromagnetic energy into light, wherein the light emitting material is sealed in the transparent tube;
    a rod-like support member for supporting the light emitting member;
    a rotating mechanism for supporting the rod-like support member with the light emitting member, the rotating mechanism rotating the rod-like support member with the light emitting member;
    a concave mirror for reflecting the light emitted from the light emitting member; and
    at least one vane or screw arranged on the rod-like support member and in the concave mirror, the at least one vane or screw inducing a flow of air around the transparent tube while the rod-like support member rotates.

2. A light source according to claim 1, wherein said rotating mechanism is arranged on the outside of the concave mirror, the concave mirror has an optical axis and an inserting hole located substantially on the optical axis, and said rod-like support member extends through the inserting hole of the concave mirror without contacting the concave mirror.

3. A projection type display comprising:
    a single light source device;
    a color separation optical system for separating a light from the light source device into light beams of three primary colors;
    three indirect modulation elements for modulating the respectively separated light beams for producing an image;
    a color combining optical system for combining the light beams modulated by the indirect modulation elements; and
    a projection lens for projecting the combined light;
    wherein said light source device comprises:
        a light emitting member including a transparent tube and a light emitting material for converting an electromagnetic energy into light, wherein the light emitting material is sealed in the transparent tube;
        a rod-like support member for supporting the light emitting member;
        a rotating mechanism for supporting the rod-like support member with the light emitting member, the rotating mechanism rotating the rod-like support member with the light emitting member ;
        a concave mirror for reflecting the light emitted from the light emitting member; and
        at least one vane or screw arranged on the rod-like support member and in the concave mirror, the at least one vane or screw inducing a flow or air around the transparent tube while the rod-like support member rotates.

* * * * *

UNITED STATES PATENT AND TRADEMARK OFFICE
CERTIFICATE OF CORRECTION

PATENT NO. : 5,614,780
DATED : March 25, 1997
INVENTOR(S) : Suzuki et al.

It is certified that error appears in the above-indentified patent and that said Letters Patent is hereby corrected as shown below:

Column 1, line 58, after "affected", insert --by--.

Column 1, line 58, delete "an".

Column 1, line 58, before " distributions", insert --color--.

Signed and Sealed this

Seventeenth Day of February, 1998

*Attest:*

BRUCE LEHMAN

*Attesting Officer*   *Commissioner of Patents and Trademarks*